No. 128,320

UNITED STATES PATENT OFFICE.

BARTOLOMÉ MOSQUERA, OF SANTIAGO, CHILI.

IMPROVEMENT IN PRESERVING MEATS, FISH, &c.

Specification forming part of Letters Patent No. 128,320, dated June 25, 1872.

*To all whom it may concern:*

Be it known that I, BARTOLOMÉ MOSQUERA, of Santiago, in the Republic of Chili, South America, have invented a certain new and Improved Process for Preserving Meat, Fish, and other like perishable articles; and I do hereby declare that the following is a full, clear, and exact description of the same.

My invention consists in the employment of certain-named chemical ingredients in such proportional parts and in such manner that meat may be preserved in its primitive or natural state by being immersed in the liquid made from said chemicals; or by certain treatment with the same chemicals both meat and fish may be preserved in a dry state, so that they may in either case be sent to any climate, and be found, when ready for use, to have retained their taste, flavor, and freshness, as will be hereinafter described.

The process is as follows for curing meats: The meat is cut up into suitable-sized pieces and put in barrels or vessels of any desired construction. A liquid is then poured in until the meat is entirely immersed, which liquid is composed of the following ingredients and in about the proportional quantities herein given: Acetic acid and carbonate of soda in necessary quantities to produce a slightly-acid solution of acetate of soda. Then water is added in such quantity as to make the liquid have a density of from three to five degrees, (aerometer for salts,) after which a few grains of salt are added to render its taste agreeable. To preserve the natural color of the meat I add to each pound of the liquid about five drops of nitrate of soda, purified; and, if deemed advisable, five drops of creosote, properly dissolved, to each pound of the liquid, may be added to render it agreeable to the taste and smell.

The meat, thus immersed, can be kept for any length of time, and transported through any atmosphere or to any climate, and will be found, when opened and washed thoroughly, to have retained its natural taste and freshness. Instead of carbonate of soda being used with acetic acid it is found by experiment that prepared chalk, in the same proportion as carbonate of soda, will answer the same purpose.

When it is desired to preserve meat, fish, or other like articles in a dry state, they are first immersed in a liquid composed of the same ingredients as above named, but of a greater density, (adding ten drops of creosote instead of five,) keeping them therein for from fifteen to twenty hours. They are then placed in proper position, to have the effect of a drying atmosphere by either natural or artificial means, until thoroughly dried; and they are ready for use after any lapse of time upon being soaked in clear water for two or three hours, when they will be found to have retained their primitive flavor and taste.

Having described my invention, I claim—

The compound, made from the ingredients and in the proportion herein named, used to preserve meat, fish, &c., as described.

In testimony whereof I have hereunto signed my name.

BARTOLOMÉ MOSQUERA.

Witnesses:
 FRANCIS S. LEIGHTON,
 EDM. F. BROWN.